| United States Patent [19] | [11] Patent Number: 4,727,113 |
| Kohyama et al. | [45] Date of Patent: Feb. 23, 1988 |

[54] CRYSTALLINE 1-BUTENE POLYMER COMPOSITION

[75] Inventors: Masaki Kohyama, Ichihara; Hiroyuki Hori, Kuga, both of Japan

[73] Assignee: Shell Oil Company, Houston, Tex.

[21] Appl. No.: 786,026

[22] Filed: Oct. 10, 1985

[30] Foreign Application Priority Data

Jul. 31, 1984 [JP] Japan ................... 59-158981

[51] Int. Cl.$^4$ ................... C08L 23/26; C08L 23/20
[52] U.S. Cl. ................... 525/193; 525/192; 525/194; 525/191; 525/938; 525/387; 526/914; 522/157
[58] Field of Search ............... 525/938, 191, 193, 194; 522/157

[56] References Cited

U.S. PATENT DOCUMENTS

| 3,144,436 | 8/1964 | Greene et al. | 526/914 |
| 3,894,120 | 7/1975 | Frese et al. | 525/191 |
| 4,001,172 | 1/1977 | Steinkamp et al. | 525/301 |
| 4,311,571 | 1/1982 | Mack | 525/191 |
| 4,417,041 | 11/1983 | Képès et al. | 526/348.6 |
| 4,677,025 | 6/1987 | Davison et al. | 428/349 |

FOREIGN PATENT DOCUMENTS

| 225430 | 4/1958 | Australia . |
| 047171 | 3/1982 | European Pat. Off. . |
| 081787 | 6/1983 | European Pat. Off. . |
| 171976 | 2/1986 | European Pat. Off. . |

OTHER PUBLICATIONS

Hong et al—". . . Form II to Form I Phase Transformations in Polybutene"—J. App. Poly. Sci., vol. 30, 3163–3188 (1985), p. 3163–86–87.

J. Boor, Jr. and J. C. Mitchell, "Kinetics of Crystallization and a Crystal–Crystal Transition in Poly-1-Butene—part A—pp. 59–84, Journal of Polymer Science, vol. 1.

*Primary Examiner*—Carman J. Seccuro
*Attorney, Agent, or Firm*—Wendy K. B. Buskop

[57] ABSTRACT

The composition of crystalline 1-butene polymer comprising
(a) a crystalline 1-butene polymer containing a 1-butene component as a main component, and
(b) a radical-treated crystalline olefinic polymer having (1) a boiling p-xylene-insoluble content of 30% by weight at most and (2) the relation satisfying the following expression $$Tc^{CL} - Tc^O \geq 1$$

wherein $Tc^{CL}$ is the crystallization temperature (°C.) of the radical-treated crystalline olefinic polymer, and $Tc^O$ is the crystallization temperature of the crystalline olefinic polymer before the radical treatment, and (c) the proportion of the radical-treated crystalline olefinic polymer (b) being 0.2 to 100 parts by weight per 100 parts by weight of the crystalline 1-butene polymer (a).

13 Claims, No Drawings

CRYSTALLINE 1-BUTENE POLYMER COMPOSITION

FIELD OF THE INVENTION

This invention relates to a crystalline 1-butene polymer composition. More specifically, this invention relates to a crystalline 1-butene polymer composition having the promoted ability with crystallization and crystal transition.

BACKGROUND OF THE INVENTION

Since crystalline 1-butene polymers have excellent creep characteristics at high temperature, strength against deformation, and abrasion resistance, work has been done positively to develop their uses as water supply pipes, slurry transporting pipes, linings for steel pipes for slurry transportation, etc. It is known that when a crystalline 1-butene polymer such as poly-1-butene is solidified from its molten state, it first becomes pseudostable II-type crystals, and subsequently, transition to stable I-type crystals takes place slowly over several days [Journal of Polymer Science: Part A, Volume 1, Pages 59–84 (1963)].

However, the speed of crystallization of the crystalline 1-butene polymer to II-type crystals and the speed of transition from the II-type crystals to the I-type crystals are not sufficiently high, and moreover, the crystalline 1-butene polymer in the state of II-type crystals is soft. Accordingly, if shaped articles of the crystalline 1-butene polymer after melt-shaping undergo deformation during conveyance, transportation, storage, etc., and their crystal transition to I-type crystals occurs, the deformation remains in the shaped articles, and the value of the shaped articles as products is reduced. Much care and expertise are required, therefore, in handling the shaped articles before their crystal transition is over. In the field of melt-shaping of the crystalline 1-butene polymer, it is strongly desired to develop a 1-butene polymer composition whose speed of crystallization to II-type crystals and speed of transition from the II-type crystals to the I-type crystals is high.

The present inventors recognized that the conventional crystalline 1-butene polymers have the aforesaid defects in melt shaping, and studied the development of a crystalline 1-butene polymer composition whose speed of crystallization to II-type crystals and speed of transition from the II-type crystals to the I-type crystals is high. Consequently, they have found that the aforesaid defects are eliminated by a composition comprising a crystalline 1-butene polymer and a crystalline olefinic polymer having specific properties. The above discovery has led to the present invention.

DETAILED DESCRIPTION OF THE PREFERRED EMBODIMENT

In accordance with this invention, the invention is achieved by a crystalline 1-butene polymer composition comprising (a) a crystalline 1-butene polymer containing a 1-butene component as a main opponent, and (b) a radical-treated crystalline olefinic polymer having (1) a boiling p-xylene-insoluble content of 30% by weight at most and (2) the relation satisfying the following expression $$T_c^{CL} - T_c^0 \geq 1$$

wherein $T_c^{CL}$ is the crystallization temperature (°C.) of the radical-treated crystalline olefinic polymer, and $T_c^0$ is the crystallization temperature of the crystalline olefinic polymer before radical treatment, and (c) the proportion of the radical-treated crystalline olefinic polymer (b) being 0.2 to 100 parts by weight per 100 parts by weight of the crystalline 1-butene polymer (a).

The crystalline 1-butene polymer (a) in the composition of this invention is a crystalline 1-butene polymer composed only of a 1-butene component or a copolymer composed of a major portion of 1-butene and a minor portion of another alpha-olefin other than 1-butene. The other alpha-olefin may, for example, be an alpha-olefin having 2 to 14 carbon atoms, such as ethylene, propylene, 1-pentene, 1-hexene, 4-methyl-1-pentene, 1-octene, 1-decene, 1-dodecene and 1-tetradecene. The alpha-olefin may be a mixture of two or more of these. When the crystalline 1-butene polymer is a copolymer of 1-butene and the alpha-olefin, the content of the alpha-olefin is usually 0.1 to 30 mole%, preferably 0.1 to 20 mole%. The degree of crystallization of the crystalline 1-butene polymer measured by an X-ray diffraction method is usually 10 to 60%, preferably 20 to 60%. Its crystallization temperature measured by a differential scanning calorimeter (crystallization temperature by DSC) is usually 30° to 90° C., preferably 40° to 90° C. The intrinsic viscosity $[\eta]$, measured in decalin at 135° C., of the crystalline 1-butene polymer is usually 0.8 to 8.0 dl/g, preferably 1.0 to 6.0 dl/g.

The radical-treated crystalline olefinic polymer (b) used in the composition of this invention is obtained by radical-treatment of a crystalline olefinic polymer. The radical treatment can be carried out, for example, by treating the crystalline olefinic polymer in the molten state by the action of a shearing force in the presence of a cross-linking agent and a polymerization initiator, or exposing the crystalline olefinic polymer to light irradiation or ionizing irradiation in the presence of a photopolymerization initiator.

The crystalline olefinic polymer may be a homopolymer or a copolymer. Preferred examples include such homopolymers as polyethylene, polypropylene, poly-1-butene, poly-1-hexene and poly(4-methyl-1-pentene), and copolymers of two or more alpha-olefins such as ethylene, propylene, 1-butene, 1-pentene, 1-hexene, 4-methyl-1-pentene, 1-octene, 1-decene and 1-dodecene.

The degree of crystallization of the crystalline olefinic polymer measured by the X-ray diffraction method is usually 10 to 90%, preferably 20 to 90%. Its crystallization temperature by DSC is usually 30° to 120° C. The intrinsic viscosity $[\eta]$ of the polymer measured in decalin at 135° C. is usually 0.8 to 6.0 dl/g, preferably 1.0 to 5.0 dl/g.

Examples of the crosslinking agent are polyfunctional (meth)acrylate compounds such as ethylene glycol di(meth)-acrylate, propylene glycol di(meth)acrylate, butylene glycol di(meth)acrylate, diethylene glycol di(meth)acrylate, polyethylene glycol di(meth)acrylate, trimethylolpropane tri-(meth)acrylate, glycerin tri-(meth)acrylate, tris[2-(meth)-acryloyloxyethyl]cyanurate, tris[2-(meth)acryloyloxy]isocyanurate,

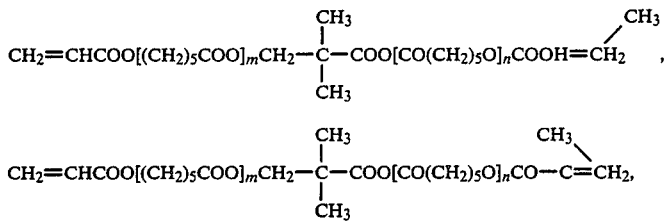

and 1,3,5-tri(meth)acryloyl]hexahydro-s-triazine; polyalkyl compounds such as triallyl]cyanurate and triallyl is isocyanurate; maleimide compounds such as phenyl maleimide; quinone dioxime compounds such as p,p'-dibenzoylquinone dioxime; and polyvinylbenzenes such as divinylbenzene and disopropenyl-benzene.

The polymerization initiator is usually an organic peroxide, preferably an organic peroxide having a decomposition temperature, at which its half life is 1 minute, of 150° to 270° C. Specifically, organic peroxides and organic peresters are preferred. Examples include benzoyl peroxide, dichlorobenzoyl peroxide, dicumyl peroxide, di-tert-butyl peroxide, 2,5-dimethyl-2,5-di(-peroxybenzoate)hexyne-3, 1,4-bis(tert-butylperoxyisopropyl)benzene, lauroyl peroxide, tert-butyl perbenzoate, tert-butyl perphenylacetate, tert-butyl perisobutyrate, tert-butyl per-sec-octoate, tert-butyl perpivalate, cumyl pivalate and tert-butyl perdiethylacetate.

The radical treatment in the presence of the crosslinking agent and the polymerization initiator is carried out at a temperature of usually 180° to 300° C., preferably 200° to 280° C. The treating time is usually 2 to 15 minutes.

Usually, a photosensitizer is used as the photopolymerization initiator. Specific examples of the photo-sensitizer include benzoin or its ethers such as benzoin, benzoin methyl ether, benzoin ethyl ether, benzoin isopropyl ether and benzoin isobutyl ether; benzophenone compounds such as benzophenone, p-chlorobenzophenone and p-methoxybenzophenone; benzil compounds such as benzil, benzil dimethyl ketal and benzil diethyl ketal; and hydroxyalkylphenyl ketone compounds such as 1-(4-isopropyphenyl)-2-hydroxy-2-methyl-1-propanone, 1-phenyl-2-hydroxy-2-methyl-1-propanone. The treating temperature in the case of using the photopolymerization initiator is usually room temperature to 100° C., and the treating time is usually 2 seconds to 2 minutes.

The radical-treated crystalline olefinic polymer (b) used in the composition of this invention has a boiling p-xylene-insoluble content of 30% by weight at most, preferably not more than 15% by weight, more preferably not more than 5% by weight. If the boiling p-xylene-insoluble content of the radical-treated crystalline olefinic polymer exceeds 30% by weight, the moldability of the composition becomes inferior, and fish eyes will form in the final molded products. Furthermore, the following relation $$Tc^{CL} - Tc^0 \geq 1$$

is established between the crystallization temperature by DSC ($Tc^0$, °C) of the radical-treated crystalline olefinic polymer and the crystallization temperature ($Tc^0$, °C) of the crystalline olefinic polymer before the radical-treatment.

When the radical-treated crystalline olefinic polymer is a radical-treated crystalline ethylenic polymer, the relation represented by the following expression is preferably established between $Tc^{CL}$ and $Tc^0$.

$$10 \geq Tc^{CL} - Tc^0 \geq 2$$

When it is a radical-treated crystalline propylene polymer, the relation of the following expression is preferably established, $$Tc^{CL} - Tc^0 \geq 10$$

and more preferably, the relation of the following expression is established.

$$30 \geq Tc^{CL} - Tc^0 \geq 14$$

When it is a radical-treated 1-butene polymer, the relation of the following formula is established preferably, $$Tc^{CL} - Tc^0 \geq 5$$

and more preferably, the relation of the following expression is established.

$$30 \geq Tc^{CL} - Tc^0 \geq 6$$

When it is a radical-treated crystalline 4-methyl-1-pentene polymer, the relation of the following expression is preferably established, $$Tc^{CL} - Tc^0 \geq 2$$

and more preferably, the relation of the following expression is preferably established.

$$10 \geq Tc^{CL} - Tc^0 \geq 4$$

The radical-treated crystalline olefinic polymer has a degree of crystallization, measured by an X-ray diffraction method, of preferably 10 to 90%, more preferably 20 to 90%.

The radical-treated crystalline olefinic polymer used in this invention preferably satisfies the following expression $$0.01 \leq \frac{MFR^{CL}}{MFR^0} \leq 100$$

and more preferably the following expression $$0.1 \leq \frac{MFR^{CL}}{MFR^0} \leq 50$$

wherein $MFR^0$ (g/10 min.) is the melt flow rate of the crystalline olefinic polymer before the radical-treatment, and $MFR^{CL}$ (g/10 min.) is the melt-flow rate of the radical-treated crystalline olefinic polymer at the same temperature.

The melt flow rate can be measured at a temperature of 190° C. under a load of 2.16 kg in the case of a crystalline ethylenic polymer and a crystalline 1-butene polymer; at a temperature of 230° C. under a load of 2.16 kg in the case of a crystalline propylene polymer; and at a temperature of 260° C. under a load of 2.16 kg in the case of a crystalline 4-methyl-1-pentene polymer.

The crystalline 1-butene polymer composition of this invention contains the crystalline 1-butene polymer (a) and the radical-treated crystalline olefinic polymer (b) such that the proportion of the radical-treated olefinic polymer is preferably 0.3 to 50 parts by weight, more preferably 0.5 to 30 parts by weight, per 100 parts by weight of the crystalline 1-butene polymer. The radical-treated crystalline olefinic polymer may comprise two or more of the above-described species. If the proportion of the radical-treated crystalline olefinic polymer (b) becomes larger than 100 parts by weight, the resulting crystalline 1-butene polymer composition has poor extrudability. If it is less than 0.2 part by weight, the effect of accelerating the speed of crystallization and the speed of crystal transition is not sufficient.

The composition of this invention may further include another crystalline olefinic polymer which is not included within the crystalline 1-butene polymer (a) and the radical-treated crystalline olefinic polymer (b).

Examples of the other crystalline olefinic polymer may be the same as those which are exemplified hereinabove as starting polymers for the radical-treated crystalline olefinic polymer (b), that is, crystalline olefinic polymers before the radical treatment.

The other crystalline olefinic polymers may be used in an amount of not more than 100 parts by weight, preferably not more than 50 parts by weight, more preferably not more than 50 parts by weight, per 100 parts by weight of the crystalline 1-butene polymer (a). If the proportion of the other crystalline olefinic polymer exceeds 100 parts by weight, the resulting crystalline 1-butene polymer composition tends to have poor creep characteristics at high temperatures.

As required, the composition of this invention may further include various additives such as antioxidants, heat stabilizers, ultraviolet absorbers, slip agents, nucleating agents, antistatic agents, fire retardants, pigments, dyes, and inorganic or organic fillers. The proportions of these additives may be properly selected according to the purpose of addition.

The crystalline 1-butene polymer composition of this invention can be prepared by blending the individual ingredients by methods known per se. For example, it can be prepared by mixing the crystalline olefinic polymer (b) and as required, the other component or additives by means of a Henschel mixer, a V-blender, etc., and then kneading the mixture by means of a kneader, a Banbury mixer, a single screw extruder, a twin screw extruder, etc.

If the other crystalline olefin polymer differs from the polymer components (a) and (b) when used, it is advantageous to employ a procedure of first kneading the polymer component (b) with the other crystalline olefinic polymer and then kneading the resulting mixture with the polymer component (a).

The following examples illustrate the present invention specifically.

The various property values shown in the examples are measured and defined as follows:

Crystallization temperature (°C.)

This is used as an index showing the speed of crystallization. The higher the crystallization temperature, the faster the speed of crystallization. About 5 mg of a sample is maintained at 200° C. for 10 minutes by using a DSC-II instrument made by Perkin Elmer Company, and the temperature is lowered at a rate of 10° C. Thus, an exothermic curve is determined. The peak temperature in the curve is defined as the crystallization temperature.

Spherulite size (microns)

The composition is hot-pressed at 200° C. using a 2 mm-thick hot plate, a 0.1 mm-thick aluminum plate, a 0.1 mm-thick biaxially oriented polyester sheet Lumirror ® produced by Toray Industries, Inc. Japan) sheet and a 1 mm-thick spacer and then cooled at a rate of about 1° C./min. to produce a press sheet. The cross-section of the press sheet is observed by a polarized microscope, and the radius of the spherulites of the press sheet is measured from the photograph taken through the polarized microscope.

Speed of crystal transition ($t_{\frac{1}{2}}$)

The speed of transition from II-type crystals to I-type crystals is determined in accordance with the method suggested by A. Turner Jones in Polymer, 7, 23 (1966). The speed is evaluated by the time ($t_{\frac{1}{2}}$) which elapses until the porportion of the II-type crystals in the entire crystals becomes 50%. The smaller the $t_{\frac{1}{2}}$ value, the faster the speed of transition.

Degree of Crystallization (%)

The X-ray diffraction method is used, and the diffraction chart is divided into amorphous scattering and crystalline scattering. The degree of crystallization is determined from the ratio of the intensity of the crystalline scattering (the area of the crystalline scattering) based on the entire intensity (area). The sample is prepared as follows: Using a press-molding machine, the polymer is melted at a temperature 30° to 80° C. higher than its melting point. The molten polymer is then cooled to room temperature at a rate of about 100° C./min. to form a press sheet. The x-ray diffraction measurement is made about 24 hours after the molding. In the case of polybutene-1, the measurement is made after the transition to the I-type crystals is over (about 10 days).

Intrinsic Viscosity ($[\eta]$, dl/g)

Measured at 135° C. in decalin.

EXAMPLES 1 TO 4

To 100 parts by weight of the crystalline 1-butene polymer (PB-1) having the properties shown in Table 1 were added an antioxidant, a rust-proof agent, 0.03 part by weight of 2,5-dimethyl-2,6-di(tert-butylperoxy)hexane (Perhexa 25B, a trade name for a product of Nippon Oils and Fats Co., Ltd.) as an organic peroxide and 2 parts by weight of triallyl cyanurate (TAC, a trade name for a product of Musashino Shoji Co., Ltd.) as a crosslinking agent. They were mixed by a Henschel mixer and kneaded at a resin temperature of 220° C. by using a single screw extruder having a screw diameter of 30 mm (kneading time 4 minutes) to obtain a radical-treated crystalline 1-butene polymer (XLPB-1). The properties of the polymer are shown in Table 2.

PB-1 and XLPB-1 were mixed by a Henschel mixer in the ratios shown in Table 3 and kneaded at 220° C. for 3 minutes and granulated by using a single screw extruder having a screw diameter of 30 mm.

The various properties of the resulting compositions were measured, and the results are shown in Table 3.

EXAMPLE 5

A radical-treated crystalline 1-butene polymer (XLPB-2) was prepared by the same method as in Example 1 except that 1 part by weight of triallyl cyanurate was used as the crosslinking agent. The properties of this polymer are shown in Table 2.

PB-1 and XLPB-2 were mixed in the ratio shown in Table 3 by a Henschel mixer, and kneaded at 220° C. (kneading time 3 minutes) and granulated by using a single screw extruder having a screw diameter of 30 mm. The properties measured are shown in Table 3.

EXAMPLE 6

To 100 parts by weight of the crystalline 1-butene polymer (PB-2) having the properties shown in Table 1 were added an antioxidant, a rust-proof agent, 0.03 part by weight of Perhexa 25B and 2 parts by weight of triallyl isocyanurate (TAIC, a trade name for a product of Nippon Chemical Co., Ltd.), and they were mixed in a Henschel mixer. The mixture was kneaded at a resin temperature of 220° C. using a single screw extruder having a screw diameter of 30 mm (kneading time 5 minutes) to obtain a radical-treated crystalline 1-butene polymer (XLPB-3). The properties are shown in Table 2.

Then, PB-2 and XLPB-3 were mixed by a Henschel mixer in the ratio shown in Table 3. The mixture was kneaded and granulated by using a single screw extruder having a screw diameter of 30 mm. The properties measured are shown in Table 3.

EXAMPLE 7

A radical-treated crystalline 1-butene polymer (XLPB-4) was prepared by the same technique as in Example 1 except that 0.03 part by weight of dicumyl peroxide (Mitsui DCP, tradename for a product of Mitsui Petrochemical Industries, Ltd.) was used as the organic peroxide. The properties are shown in Table 2.

PB-1 and XLPB-4 were mixed in the ratio shown in Table 3 by a Henschelmixer, and the mixture was kneaded and granulated under the same conditions as in Example 1 using a single screw extruder having a screw diameter of 30 mm. The properties measured are shown in Table 3.

EXAMPLE 8

A radical-treated crystalline 1-butene polymer (XLPB-5) was prepared by the same technique as in Example 1 except that 2 parts by weight of 1,6-hexanediol dimethacrylate (NK ESTER HD, a product of Shin Nakamura Chemical Co. Ltd.) was used as the crosslinking agent. The properties of this polymer are shown in Table 2 below.

PB-1 and XLPB-5 were mixed in the ratio shown in Table 3 by a Henschel mixer, and the mixture was kneaded and granulated under the same conditions as in Example 1. The properties measured are shown in Table 3.

COMPARATIVE EXAMPLE 1

PB-1 and XLPB-1 were mixed in the ratio shown in Table 3 by a Henschel mixer, and the mixture was kneaded and granulated under the same conditions as in Example 1 by means of a single screw extruder having a screw diameter of 30 mm. The properties measured are shown in Table 3.

TABLE 1

| Polymer | PB-1 | PB-2 |
| --- | --- | --- |
| Type of comonomer | — | Propylene |
| Comonomer content (mole %) | 0 | 3.2 |
| Degree of crystallization (%) | 54 | 50 |
| Crystallization temperature $T_c$ (°C.) | 78 | 66 |
| $[\eta]$ (dl/g) | 3.8 | 2.5 |

TABLE 2

| Polymer | XLPB-1 | XLPB-2 | XLPB-3 | XLPB-4 | XLPB-5 |
| --- | --- | --- | --- | --- | --- |
| Organic peroxide | Perhexa 25B | Perhexa 25B | Perhexa 25B | Mitsui DCP | Perhexa 25B |
| Amount added (parts by weight) | 0.03 | 0.03 | 0.03 | 0.03 | 0.03 |
| Crosslinking agent | TAC | TAC | TAIC | TAC | NK ESTER HD |
| Amount added (parts by weight) | 2 | 1 | 2 | 2 | 2 |
| $T_c^{CL}\text{-}T_c^O$ (°C.) | 13 | 9 | 11 | 13 | 14 |
| Degree of crystallization (%) | 58 | 56 | 52 | 55 | 57 |
| Boiling p-xylene-insoluble content (wt %) | 0.6 | 0.3 | 0.4 | 0.4 | 2.6 |
| $MFR^{CL}/MFR^O$ | 9.7 | 15.4 | 33.4 | 1.1 | 1.4 |

TABLE 3

| | Composition (by weight) | Crystallization temperature (°C.) | Radius of spherulite ($\mu$) | Speed of crystal transition $t\frac{1}{2}$ (hr) |
| --- | --- | --- | --- | --- |
| Example 1 | PB-1/XLPB-1 = 100/0.5 | 85.0 | 50 (*) | 38 |

TABLE 3-continued

|  | Composition (by weight) | Crystallization temperature (°C.) | Radius of spherulite (μ) | Speed of crystal transition t ½ (hr) |
|---|---|---|---|---|
| Example 2 | PB-1/XLPB-1 = 100/2 | 86.2 | 30 (*) | 27 |
| Example 3 | PB-1/XLPB-1 = 100/5.2 | 88.2 | 20 (*) | 22 |
| Example 4 | PB-1/XLPB-1 = 100/11.1 | 90.5 | 20 (*) | 21 |
| Example 5 | PB-1/XLPB-2 = 100/2 | 84.9 | 50 (*) | 30 |
| Example 6 | PB-2/XLPB-3 = 100/2 | — | — | 30 |
| Example 7 | PB-I/XLPB-4 = 100/2 | 86.8 | 30 (*) | 19 |
| Example 8 | PB-1/XLPB-5 = 100/2 | 91.0 | 20 (*) | 10 |
| Comparative Example 1 | PB-1/XLPB-1 = 100/0.1 | 85.9 | 80 | 44 |

(*): No clear spherulitic structure was noted.

EXAMPLES 9 TO 12

To 100 parts by weight of the crystalline propylene polymer (PP-1) having the properties shown in Table 4 were added an antioxidant, a rust-proof agent, 0.03 part by weight of 2,5-dimethyl-2,5-di(tert-butylperoxy)hexane (trade name Perhexa 25B) as an organic peroxide and 2 parts by weight of triallyl cyanurate (trade name TAC) as a crosslinking agent, and they were mixed by a Henschel mixer. The mixture was kneaded at a resin temperature of 220° C. for 5 minutes by using a single screw extruder having a screw diameter of 30 mm to form a radical-treated crystalline propylene polymer (XLPP-1). The properties of the polymer are shown in Table 5.

PB-1 and XLPP-1 were mixed in the ratios shown in Table 6 by means of a Henschel mixer, and the mixtures were each kneaded at 220° C. for 3 minutes, and granulated, by using a single screw extruder having a screw diameter of 30 mm.

The properties of the resulting compositions were measured, and the results are shown in Table 6.

EXAMPLE 13

A crystalline propylene polymer (XLPP-2) was prepared by the same method as in Example 9 except that the amount of triallyl cyanurate as the crosslinking agent was changed to 1 part by weight. The properties of the polymer are shown in Table 5.

PB-1 and XLPP-2 were mixed in the ratio shown in Table 6 by a Henschel mixer. The mixture was kneaded and granulated under the same conditions as in Example 9 by using a single screw extruder having a screw diameter of 30 mm. The measured properties are shown in Table 6.

EXAMPLE 14

To 100 parts by weight of the crystalline ethylene polymer having the properties shown in Table 4 were added an antioxidant, a rust-proof agent, 0.01 part by weight of Perhexa 25B and 0.01 part by weight of triallyl isocyanurate (trade name TAIC), and they were mixed by a Henschel mixer. The mixture was kneaded at a resin temperature of 220° C. for 5 minutes by a single screw extruder having a screw diameter of 30 mm to form a radical-treated crystalline ethylene polymer (XLPE-1). The properties are shown in Table 5.

PB-1 and XLPE-1 were mixed in the ratio shown in Table 6 by a Henschel mixer, and the mixture was kneaded and granulated under the same conditions as in Example 9 by using a single screw extruder having a screw diameter of 30 mm. The properties measured are shown in Table 6.

EXAMPLE 15

A radical-treated crystalline propylene polymer (XLPP-3) was prepared by the same technique as in Example 9 except that 0.03 part by weight of dicumyl peroxide (Mitsui DCP) was used as the organic peroxide. The properties of the polymer are shown in Table 5.

PB-1 and XLPP-3 were mixed in the ratio shown in Table 6 by a Henschel mixer. The mixture was kneaded and granulated under the same conditions as in Example 9 using a single screw extruder having a screw diameter of 30 mm. The measured properties are shown in Table 6.

EXAMPLE 16

A radical-treated crystalline propylene polymer (XLPP-4) was prepared by the same technique as in Example 9 except that 2 parts by weight of trimethylolpropane triacrylate (TMPTA, a product of Nippon Kayaku Co., Ltd.) was used as the crosslinking agent. The properties of the polymer are shown in Table 5.

PB-1 and XLPP-4 were mixed in the ratio shown in Table 6 by a Henschel mixer. The mixture was kneaded and granulated under the same conditions as in Example 9 by using a single screw extruder having a screw diameter of 30 mm. The measured properties are shown in Table 6.

COMPARATIVE EXAMPLE 2

PB-1 and XLPP-1 were mixed in the ratio shown in Table 6 by a Henschel mixer, and the mixture was kneaded and granulated under the same conditions as in Example 9 by using a single screw extruder having a screw diameter of 30 mm. The measured properties are shown in Table 6.

COMPARATIVE EXAMPLE 3

To 100 parts by weight of the crystalline ethylene polymer (PE-2) having the properties shown in Table 4 were added an antioxidant, a rust-proof agent, 0.4 part by weight of Perhexa 25B and 1 part by weight of triallyl isocyanurate, and they were mixed by a Henschel mixer. The mixture was kneaded and granulated at a resin temperature of 140° C. by using a single screw extruder having a diameter of 30 mm, and then heated at 280° C. for 10 minutes to obtain a radical-treated crystalline ethylene polymer (XLPE-2). The properties of this polymer are shown in Table 5.

PB-1 and XLPE-2 were mixed in the ratio shown in Table 6 by a Henschel mixer, and then kneaded and granulated under the same conditions as in Example 9 by using a single screw extruder having a screw diameter of 30 mm. The properties of the polymer measured are shown in Table 6.

TABLE 4

| Polymer | PP-1 | PE-1 | PE-2 |
|---|---|---|---|
| Degree of crystallization (%) | 65 | 78 | 81 |
| Crystallization temperature $T_c$ (°C) | 112 | 113 | 115 |
| $[\eta]$ (dl/g) | 2.0 | 1.7 | 0.9 |

TABLE 5

| Polymer | XLPP-1 | XLPP-2 | XLPP-3 | XLPP-4 | XLPE-1 | XLPE-2 |
|---|---|---|---|---|---|---|
| Organic peroxide | Perhexa 25B | Perhexa 25B | DCP | Perhexa 25B | Perhexa 25B | Perhexa 25B |
| Amount added (parts by weight) | 0.03 | 0.03 | 0.03 | 0.03 | 0.01 | 0.4 |
| Crosslinking agent | TAC | TAC | TAC | TMPTA | TAIC | TAIC |
| Amount added (parts by weight) | 2 | 1 | 2 | 2 | 0.02 | 1 |
| Boiling p-xylene-insoluble content (wt. %) | 0.5 | 0.4 | 0.5 | 1.1 | 0.8 | 85.1 |
| Degree of crystallization (%) | 64 | 63 | 63 | 65 | 76 | 73 |
| $MFR^{CL}/MFR^O$ | 1.9 | 2.1 | 1.7 | 1.2 | 0.7 | about 0 |
| $T_c^{CL}\text{-}T_c^O$ (°C) | 17 | 15 | 17 | 17 | 2 | −2 |

TABLE 6

| | Composition (by weight) | Crystallization temperature (°C) | Radius of spherulite (μ) | Speed of crystal transition $t_{\frac{1}{2}}$ (hr) |
|---|---|---|---|---|
| Example 9 | PB-1/XLPP-1 = 100/0.5 | 77.5 | 70 (*) | 22 |
| Example 10 | PB-1/XLPP-1 = 100/1 | 77.2 | 50 (*) | 19 |
| Example 11 | PB-1/XLPP-1 = 100/2 | 77.0 | 30 (*) | 14 |
| Example 12 | PB-1/XLPP-1 = 100/5 | 75.0 | 30 (*) | 13 |
| Example 13 | PB-1/XLPP-2 = 100/2 | 76.5 | 70 (*) | 17 |
| Example 14 | PB-2/XLPE-1 = 100/2 | 86.1 | 50 (*) | 17 |
| Example 15 | PB-1/XLPP-3 = 100/2 | 75.9 | 50 (*) | 16 |
| Example 16 | PB-1/XLPP-4 = 100/2 | 76.2 | 50 (*) | 16 |
| Comparative Example 2 | PB-1/XLPE-1 = 100/0.1 | 77.6 | 100 | 30 |
| Comparative Example 3 | PB-1/XLPE-2 = 100/0.1 | 79.5 | 80 | 35 |

(*): No clear spherulitic structure was noted.

EXAMPLES 17 TO 20

PB-1, XLPB-1 and polyethylene (PE-3) having the properties shown in Table 7 were mixed in each of the ratios shown in Table 8 by a Henschel mixer, and then kneaded (kneading time 3 minutes) and granulated at 220° C. by using a single screw extruder having a screw diameter of 30 mm. The properties of each of the compositions obtained were measured, and the results are shown in Table 8.

EXAMPLE 21

PB-1, XLPB-2 and PE-3 were mixed in the ratio shown in Table 8 by a Henschel mixer, and then kneaded and granulated under the same conditions as in Example 17 by using a single screw extruder having a screw diameter of 30 mm. The properties measured are shown in Table 8.

EXAMPLE 22

PB-2, XLPB-3 and polypropylene (PP-2) having the properties shown in Table 7 were mixed in the ratio shown in Table 8 by a Henschel mixer, and kneaded and granulated under the same conditions as in Example 17 by using a single screw extruder having a screw diameter of 30 mm.

EXAMPLE 23

PB-1, XLPB-4 and PP-2 were mixed in the ratio shown in Table 8 by a Henschel mixer, and then kneaded and granulated under the same conditions as in Example 17 by using a single screw extruder having a screw diameter of 30 mm. The properties measured are shown in Table 8.

EXAMPLE 24

PB-1, XLPB-5 and polyethylene (PE-4) having the properties shown in Table 7 were mixed in the ratio shown in Table 8 by a Henschel mixer, and kneaded and granulated under the same conditions as in Example 17 by using a single screw extruder having a screw diameter of 30 mm. The properties measured are shown in Table 8.

TABLE 7

| | PE-3 | PE-4 | PP-2 |
|---|---|---|---|
| Degree of crystallization (%) | 75 | 78 | 62 |
| Crystallization temperature $T_c$ | 112 | 113 | 110 |

TABLE 7-continued

|  | PE-3 | PE-4 | PP-2 |
| --- | --- | --- | --- |
| (°C.) | | | |
| [η] (dl/g) | 2.1 | 1.7 | 2.5 |

TABLE 8

|  | Composition (by weight) | Crystallization temperature (°C.) | Radius of spherulite (μ) | Speed of crystal transition t ½ (hr) |
| --- | --- | --- | --- | --- |
| Example 17 | PB-1/XLPB-1/PE-3 = 100/0.5/0.5 | 84.9 | 30 (*) | 24 |
| Example 18 | PB-1/XLPB-1/PE-3 = 100/1/1 | 86.6 | 20 (*) | 24 |
| Example 19 | PB-1/XLPB-1/PE-3 = 100/1.7/0.3 | 87.1 | 20 (*) | 25 |
| Example 20 | PB-1/XLPB-1/PE-3 = 100/5/1 | 87.9 | 20 (*) | 18 |
| Example 21 | PB-1/XLPB-2/PE-3 = 100/1/1 | 81.0 | 30 (*) | 33 |
| Example 22 | PB-2/XLPB-3/PP-2 = 100/1/1 | — | — | — |
| Example 23 | PB-1/XLPB-4/PP-2 = 100/1/1 | 87.1 | 20 (*) | 14 |
| Example 24 | PB-1/XLPB-5/PE-4 = 100/1/1 | 89.3 | 20 (*) | 17 |

(*): No clear spherulitic structure was noted.

Since the crystalline 1-butene polymer composition of this invention has an excellent effect of accelerating crystallization and crystal transition, it is free from the defect that the polymer composition undergoes crystal transition while it is being deformed during storage, transportation, conveyance or use after melt-shaping and consequently decreases in commercial value.

What is claimed:

1. A crystalline 1-butene polymer composition comprising
   (a) a crystalline 1-butene polymer containing a 1-butene component as a main component, and
   (b) a radical-treated crosslinked crystalline polymer having alpha olefin homopolymer or copolymer consisting of two or more alpha olefins which has
   (1) a boiling p-xylene-insoluble content of 30% by weight at most and (2) the relation satisfying the following expressions $$Tc^{CL} \geq Tc^0 \geq 1$$

wherein $Tc^{CL}$ is the crystallization temperature (°C.) of the radical-treated crystalline olefinic polymer, and $Tc^0$ is the crystallization temperature of the crystalline olefinic polymer before the radical treatment, and $0.01 < (MFR^{CL})/(MFR^0) < 100$ wherein $MFR^0$ (g/10 min) is the melt flow rate of the crystalline polymer before treatment and $MFR^{CL}$ (g/10 min) is the melt flow rate of the crystalline polymer after treatment, and (c) the proportion of the radical-treated crosslinked crystalline polymer (b) being 0.2 to 100 parts by weight per 100 parts by weight of the crystalline 1-butene polymer (a), said treatment being effected in the presence of a cross linking agent and a polymerization initiator, or by irradiating light onto the crystalline polymer in the presence of a photopolymerization initiator.

2. The composition set forth in claim 1 wherein the crystalline 1-butene polymer (a) is a homopolymer of 1-butene or a copolymer of 1-butene with another alpha-olefin.

3. The composition set forth in claim 2 wherein the other alpha-olefin is an alpha-olefin having 2 to 14 carbon atoms other than 1-butene.

4. The composition set forth in claim 1 wherein the crystalline 1-butene polymer (a) has a crystallization temperature of 10° to 60° C.

5. The composition set forth in claim 1 wherein the crystalline 1-butene polymer (a) has a crystallization temperature of 30° to 90° C.

6. The composition set forth in claim 1 wherein the crystalline 1-butene polymer (a) has an intrinsic viscosity, as measured in decalin at 135° C., of 0.8 to 8.0.

7. The composition set forth in claim 1 wherein the radical-treated, crosslinked crystalline polymer (b) has a boiling p-exylene-insoluble content of not more than 15% by weight.

8. The composition set forth in claim 1 wherein the radical-treated, crosslinked crystalline polymer (b) has a boiling p-xylene-insoluble content of not more than 15% by weight.

9. The composition set forth in claim 1 wherein the radical-treated, crosslinked crystalline polymer (b) has a degree of crystallization of 10 to 90%.

10. The composition set forth in claim 1 wherein the radical-treated, crosslinked crystalline polymer (b) is a radical-treated crystalline 1-butene polymer having the relation satisfying the following expression $$Tc^{CL} \geq Tc^0 \geq 5$$

wherein $Tc^{CL}$ and $Tc^0$ are as defined in claim 1.

11. The composition set forth in claim 1 which further comprises another crystalline alpha olefin homopolymer or copolymer consisting of two or more alpha olefins which differs from the components (a) and (b).

12. The composition set forth in claim 1 wherein the proportion of the polymer component (b) is 0.3 to 50 parts by weight per 100 parts by weight of the polymer component (a).

13. The composition set forth in claim 11 wherein the proportion of the other crystalline polymer is 0.2 to 100 parts by weight per 100 parts by weight of the polymer component (a).

* * * * *